United States Patent [19]

Kerr

[11] 4,236,508

[45] Dec. 2, 1980

[54] SOLAR COOKER AND METHOD OF ASSEMBLY

[75] Inventor: Barbara P. Kerr, Tempe, Ariz.

[73] Assignee: Elsa D. Cole, Tempe, Ariz. ; a part interest

[21] Appl. No.: 968,303

[22] Filed: Dec. 11, 1978

[51] Int. Cl.³ .............................................. F24J 3/02
[52] U.S. Cl. .................................. 126/451; 126/452; 126/450
[58] Field of Search ...................... 126/451, 450, 452; 220/430, 431, 432, 433, 445

[56] References Cited

U.S. PATENT DOCUMENTS

| 3,023,753 | 3/1962 | Wheless | 126/451 |
|---|---|---|---|
| 3,028,856 | 4/1962 | Daymon | 126/451 X |
| 3,236,227 | 2/1966 | Steinberg | |
| 3,301,171 | 1/1967 | Steinberg | 126/451 |
| 3,406,811 | 10/1968 | Higley | 220/331 X |
| 3,741,430 | 6/1973 | Bergh et al. | 220/331 |
| 3,896,786 | 7/1975 | Clevett | 126/451 |
| 3,938,497 | 2/1976 | Androssy | |
| 4,018,212 | 4/1977 | Hein et al. | |
| 4,082,079 | 4/1978 | Rodgers | 126/451 |
| 4,103,805 | 8/1978 | Silverstein | 220/331 |
| 4,130,106 | 12/1978 | Clevett et al. | 126/451 |

FOREIGN PATENT DOCUMENTS 2377010 8/1978 France ..................................... 126/451

Primary Examiner—James C. Yeung
Assistant Examiner—Larry Jones
Attorney, Agent, or Firm—Warren F. B. Lindsley

[57] ABSTRACT

A method of assembling from kit components a solar oven and in so doing, teaching the assembler the principals involving insulation, reflection, solar ray conversion to heat, temperature conservation and the fine art of cookery.

10 Claims, 8 Drawing Figures

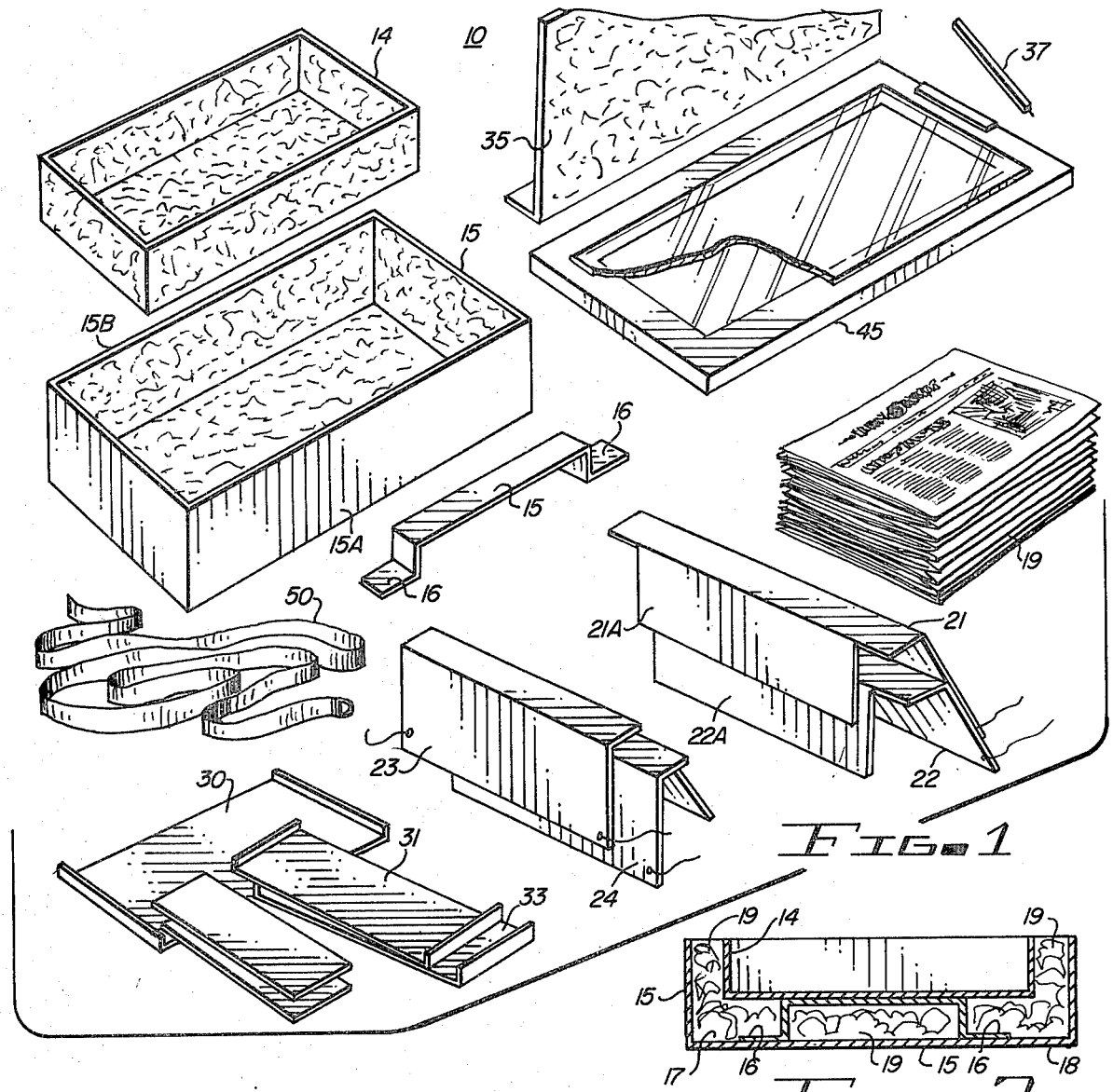
FIG-1
FIG-2
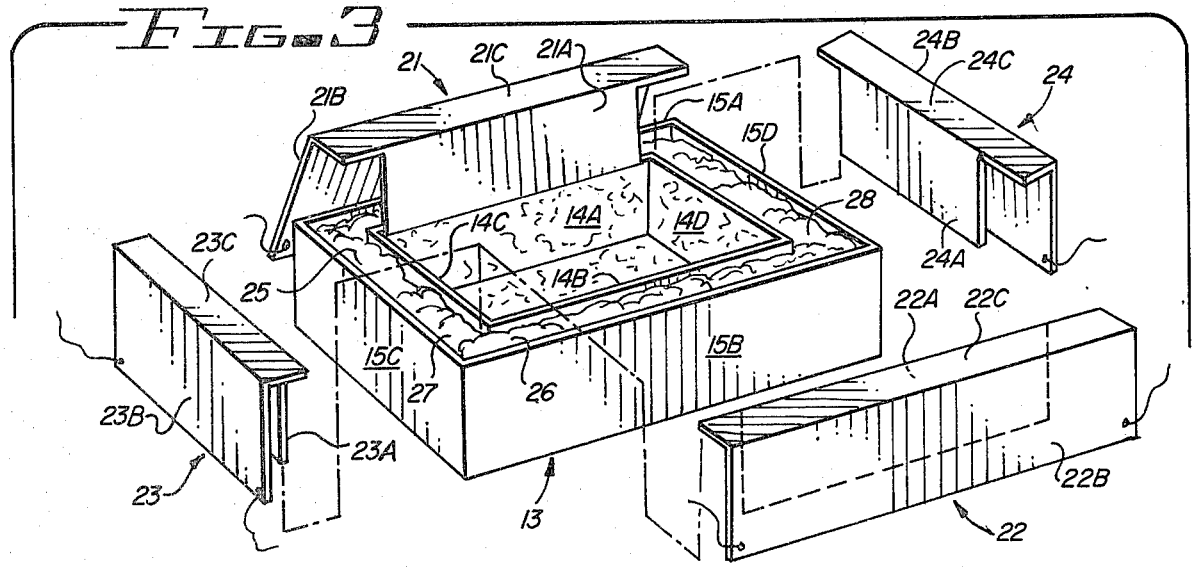
FIG-3

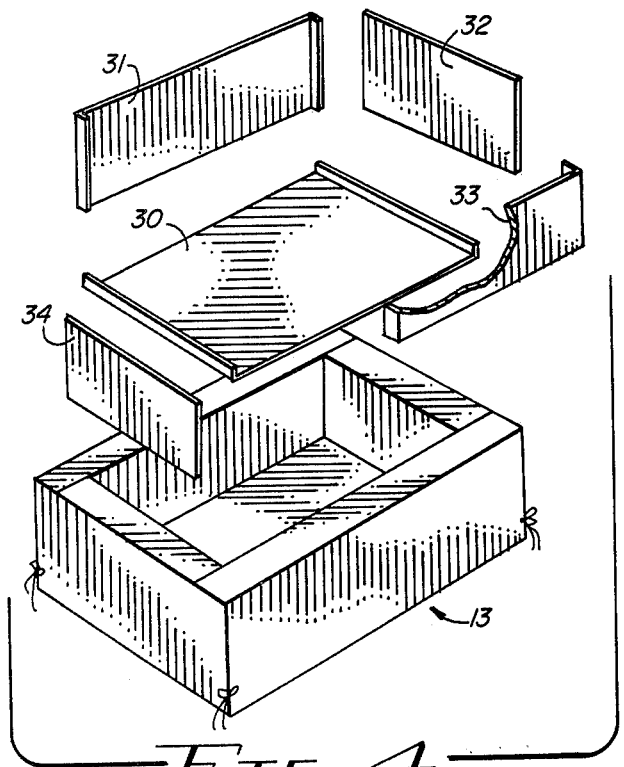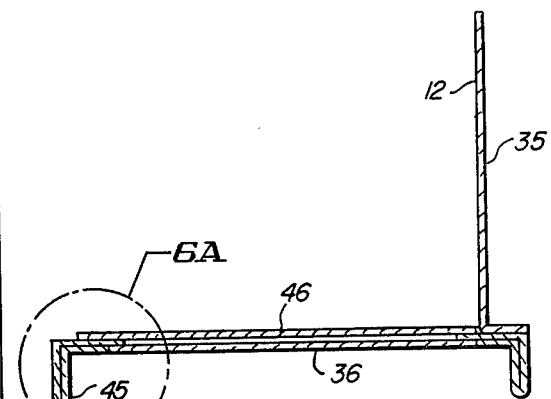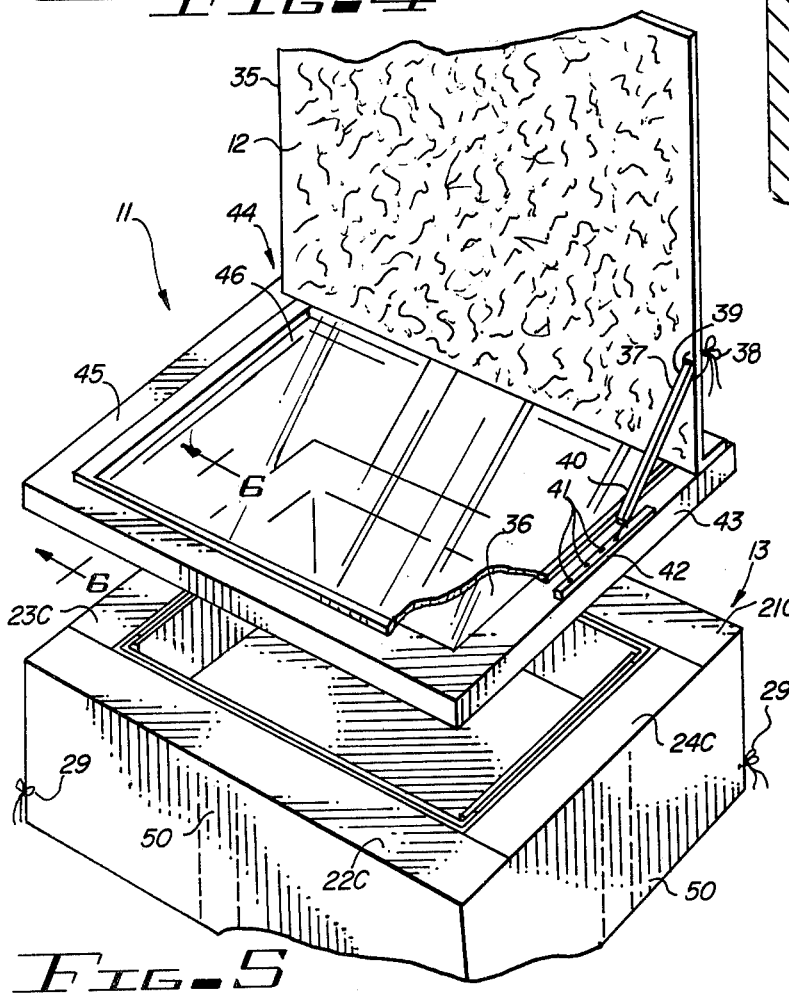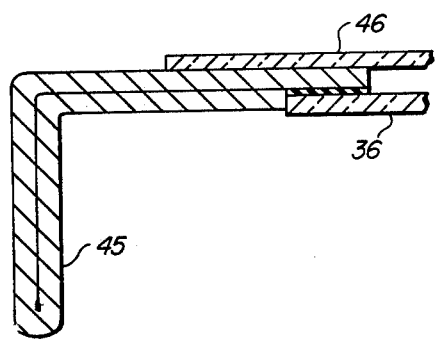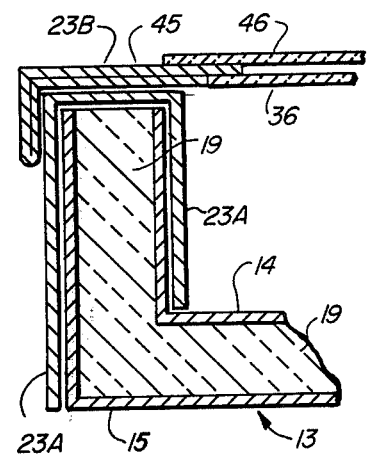

SOLAR COOKER AND METHOD OF ASSEMBLY

BACKGROUND OF THE INVENTION

This invention concerns apparatus and mechanism for concentrating solar energy, and more particularly solar cookers designed to trap the radiant energy of the sun which is a form of heat and raise the temperature in a specially constructed oven for cooking purposes. This invention is further directed to a kit for assembling such a cooker from readily available components, teaching the assembler in so doing the value and characteristics of its various components.

PRIOR ART

Solar cookers of various types have been known but their principals of construction and operation have not been generally understood by the users and particularly youngsters learning the values of insulation, conservation, solar ray phenomenon and the fine art of cookery.

U.S. Pat. No. 3,236,227 discloses an auxiliary heating means for solar ovens, but it does not disclose a simple kit from which a solar oven can be constructed, at the same time teaching by its assembly the characteristics and value of its various components.

U.S. Pat. No. 3,938,497 discloses an apparatus for solar cooking employing a frame or base readily movable for locating the apparatus in a favorable exposure to the sun. The oven disclosed is tiltable on the frame to follow the sun.

U.S. Pat. No. 4,018,212 discloses a solar heating and cooking apparatus disclosing a housing permanently stationed inside a residential structure employing a radiation pipe extending through the exterior wall of the building to deliver a concentrated beam of solar radiation rays to a receiver.

None of the patents disclose a simple structure that can be built by the young from a kit so that they can not only assemble an operable solar oven, but also learn about its characteristics and direct use of solar energy while assembling the oven.

SUMMARY OF THE INVENTION

In accordance with the invention claimed, a novel method and kit are provided for building a solar oven while teaching the characteristics of the oven and its component parts during assembly as well as teaching some of the characteristics of the fine art of cookery during its use.

It is, therefore, one object of this invention to provide a method and kit for assembling solar ovens.

Another object of this invention is to provide a kit for assembling an efficient solar heating and cooking apparatus from readily available inexpensive materials which can be used for cooking purposes and then quickly dismantled and again re-assembled and used by others thereby repetitively serving as an effective teaching aid.

A further object of this invention is to provide an improved effective kit assembled solar cooker which is convenient to use in cooking operations.

A still further object of this invention is to provide a solar ray concentrator of relatively low cost and size producing an economical source of power.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective exploded view of the components of a kit for assembling a solar oven in accordance with the teaching of this invention;

FIG. 2 is a cross-sectional view of the base of the assembled oven showing the heating surface supported above and insulated from the bottom and sides of the oven;

FIG. 3 is a further exploded perspective view of the components of the kit at a point in the solar oven's construction;

FIG. 4 is a still further exploded perspective view of the construction of the solar oven illustrating the components and assembling of the lining of the cooking compartment;

FIG. 5 is a still further exploded perspective view illustrating the cover and solar ray reflective surface of the oven;

FIG. 6 is a cross-sectional view of FIG. 5 taken along the line 6—6;

FIG. 6A is an enlargement of the circled area 6A of FIG. 6; and

FIG. 7 is a partial cross-sectional view of the solar oven shown in FIGS. 1-6 illustrating the cover in cooking position.

DESCRIPTION OF THE PREFERRED EMBODIMENT

Referring more particularly to the drawings by characters of reference, FIG. 1 discloses the component parts for a kit 10 assembling a simple but effective solar oven 11 shown in FIG. 5 while making obvious in its assembly the characteristics and benefits of its component parts.

The solar cooker comprises a well insulated box with one reflecting surface 12 which aids in concentrating the solar rays in the oven portion 13 of the solar oven.

As shown in FIG. 1, the kit 10 comprises two open top boxes 14 and 15 which may be formed of cardboard with box 14 being of such a size that it can be placed within box 15 in spaced arrangement thereto in the manner shown in FIGS. 2 and 3. In order to space and hold the small box 14 in the position shown in FIG. 2, a brace 15 may be utilized and placed with its flanges or legs 16 positioned to rest on the inside surface 17 of the bottom 18 of box 15.

Suitable insulation 19 which may be crumpled or wadded newspaper or any other suitable non-toxic form of insulating material, such as fiberglass, cellulose and the like, is placed between the inner and outer positioned boxes 14 and 15 to fill the cavity therebetween. It should be noted that this space may also be simply an air space which also is one form of an insulating medium.

The next step in the assembly of the solar oven from its component parts is to position topper spacers 21, 22 and 23, 24 in position for straddling the space between the juxtapositioned boxes 14 and 15, thereby interlocking them together but at the same time closing the spaces between the boxes 14 and 15 so that these spaces form an effective insulating medium.

As noted from FIG. 3, the topper spacers 21 and 22 formed in a U-shaped configuration are positioned with their narrower legs 21A and 22A arranged to lie along and juxtapositioned to the inside surfaces 14A and 14B of box 14 and with their legs 21B and 22B lying juxtapositioned to and along the outside surfaces 15A and 15B of box 15. The bight or interconnecting portions 21C and 22C of the spacers close the sides of the spaces 25 and 26 between the boxes 14 and 15.

Topper spacers 23 and 24 are formed in a U-shaped configuration similar to spacers 21 and 22 and are arranged to have their legs 23A and 24A and 23B and 24B lie adjacent the inside surfaces 14C and 14D of box 14 and the outside surfaces 15C and 15D, respectively, in the manner of spacers 21 and 22 with their bights 23C and 24C covering the insulating spaces 27 and 28. Tie strings 29 with one string attached to each of the corners of each of the spacers as shown in FIG. 5 are used to hold the topper spacers to the outside surface of box 15.

In order to make the inner surfaces of box 14 more heat absorbing, these surfaces may either be covered or painted with a black heat absorbing paint or material. As shown in FIG. 4, the bottom and inner sides of box 14 may be covered with suitable black foil liners 30, 31, 32, 33 and 34 or more firmly constructed black surface liners, if so desired. These liners may interlock together in any suitable manner so that they may be readily disassembled when necessary.

The inside of cover 35 of the cooker may comprise reflector 12. This cover may be hingedly attached at the edge of the glazing opening on the top of cap lid 45 in any suitable manner. One satisfactory method is to use a cloth material glued to the outside surface of cap lid 45 and the juxtapositioned edge of the outside, non-reflective surface of cover 35.

The cap lid 45 which may rest on the bights of topper spacers 21, 22, 23 and 24 and over lap the top peripheral edge of box 15 incorporates a transparent member such as glass 36, as illustrated in FIGS. 5 and 7.

As shown in the drawing for purposes of illustration, a plate of plastic material 46 is spacedly positioned from glass 36 with this material simply laid onto or suitably fastened to the top surface of cap lid 45. Glass 36 may be fastened such as by a silicone seal to the under surface of the cap lid 45 as shown in FIGS. 6 and 6A. The reason for using the plastic material 46 in lieu of glass is to protect children from breakage when making and using the solar cooker.

In order to hingedly position cover 35 in one of a number of annular positions relative to the top of cap lid 45, a brace 37 is utilized which may be loosely attached at one end by a string bow 38 passing through an aperture in end 39 of brace 37 and a couple of spaced holes in cover 35 and tied together, as shown in FIG. 5, or secured in one of a number of appropriate flexible ways. The other end 40 of brace 37 may have a tapered configuration for fitting into one of a number of spaced grooves 41 in a rail 42 fastened along the top surface of cap lid 45.

It should be noted that a method for forming a novel solar cooker has been disclosed, the assembly of which aids in teaching the principles of energy use and conservation as related to solar energy and further as a method for forming a useful apparatus for cooking various foods placed in cooking utensils placed on a grid or directly on the top surface of the bottom of box 14.

When the cooker is not in use, a strap 50 may be placed around the cooker with its cover 35 pivoted in parallel arrangement with the cap lid 45 to maintain all of the components of the cooker in a compact arrangement.

With proper utensils containing the food to be cooked placed in the solar cooker 10 on top of a grid or tray positioned within box 14 and with a suitable thermometer placed adjacent thereto, the cooker is turned toward the sun with cover 35 propped up so that its reflective surface squarely faces the sun. The cover 35 is then hingedly moved until its reflective solar rays are directed into the hollow interior of box 14 and onto the utensils. At this point, the cap lid 45 is resting on the top surfaces of the topper spacers 21-24 so as to capture all of the heat directed in box 14 either directly by the sun or reflected thereinto by the reflective surface of cover 35. The brace 37 is used in the normal manner to keep the cover 35 in its selected position.

Although the disclosed solar cooker may be formed essentially from cardboard components, the cooker can be made of any other suitable material, such as wood, fiberglass or plastic and still fall within the scope of the disclosed invention.

It will now be recognized that a significantly improved solar oven or cooker is provided over the prior art in accordance with the stated objects of the invention, and while but one embodiment of the invention has been illustrated and described, it will be apparent to those skilled in the art that various changes and modifications may be made therein without departing from the spirit of the invention or from the scope of the appended claims.

What is claimed is:

1. A solar oven comprising:
   a first box having an open top,
   a second box having an open top of a smaller size than said first box and arranged within and spacedly positioned from the bottom, sides and ends of said first box,
   the inside surface of said second box having a heat absorbing surface,
   topper spacer means closing the space between said first and second boxes at their open tops,
   said topper spacer means comprising two pairs of U-shaped clamps for positioning over the edges of the periphery of the tops of said first and second boxes to cover the space therebetween and hold the boxes in a given position relative to the other,
   each clamp of each pair comprising a pair of legs interconnected by a bight,
   the legs of said first pair of clamps fitting over the opposed surfaces of different juxtapositioned ends of the first and second boxes,
   the legs of the second pair of spacers fitting over the opposed surfaces of a different juxtapositioned side of the first and second boxes,
   the bights of the clamps covering the spaces between said first and second boxes at their open tops,
   a transparent enclosing means comprising a cap lid resting above the edges of the open tops of said first and second boxes and on the topper spacers for closing the open top end of said second box,
   said enclosing means comprising a pair of spaced transparent plates having a closed air space therebetween, and
   a reflective means of substantially the same size as the opening of said first box hingedly attached to said cap lid for selective movement relative thereto, and
   detachable brace means arranged to extend between said reflective means and said top of said cap lid for holding said reflective means in one of a plurality of angular positions relative to the top of said cap lid for directing solar rays into the opening of said second box.

2. The solar oven set forth in claim 1 in further combination with:
insulating means positioned within the space between said first and second boxes.

3. The solar oven set forth in claim 1 wherein:
said enclosing means comprises a pair of spaced transparent plates,
the exposed one, when in oven closing position, closing the openings of said first and second boxes, comprises a plastic material.

4. The solar oven set forth in claim 3 wherein:
said enclosing means comprises a cardboard cap lid having said plastic material positioned on the top of the cap lid, and
a glass plate adhered to the bottom surface of the cap lid.

5. The solar oven set forth in claim 1 wherein:
the open peripheries of said first and second boxes are coplanar.

6. The solar oven set forth in claim 1 in further combination with:
means for fastening together the legs of the clamps around the outer periphery of the box.

7. The solar oven set forth in claim 1 wherein:
said first and second boxes and said clamps are formed of cardboard or other suitable material.

8. A method for assembling a solar oven comprising the steps of:
placing an open top box within a second open top box in spaced arrangement therewith with the peripheries of the opening of said boxes being coplanar,
covering the inside surface of said second box with a heat absorbing material,
filling the space between said boxes with an insulating material,
placing clamp means over the peripheral edges of said first and second boxes for closing the space between the boxes and for holding them in a fixed position one relative to the other,
placing a transparent cap lid, enclosing member comprising a pair of spaced plates enclosing an air space therebetween across the open end of the boxes,
hingedly mounting a reflective surface of a similar size to the opening of said second box on the top periphery of the cap lid for reflecting solar rays into said first box, and
selectively moving said reflective surface to orient it to the sun.

9. The method set forth in claim 8 wherein:
said enclosing member comprises a pair of spaced plates, the exposed one of which is formed of a transparent plastic and the other one comprising a plate of transparent glass,
said enclosing member extending down over the edges of said clamp means covering the boxes in a capping fashion.

10. The method set forth in claim 8 wherein:
said boxes and clamps are formed of cardboard or other suitable material.

* * * * *